Patented Jan. 1, 1935

1,985,977

UNITED STATES PATENT OFFICE 1,985,977

MANGANESE CARBOXYLATES AND THE PROCESS OF MAKING THEM

Nicholas D. Cheronis, Chicago, Ill., assignor to The Synthetical Laboratories, Chicago, Ill.

No Drawing. Application April 8, 1933,
Serial No. 665,235

8 Claims. (Cl. 260—11)

My invention relates to manganese compounds suitable for the treatment of infectious diseases such as staphylococcus infections, influenza, and lethargic encephalitis, as by intramuscular administrations.

The object of this invention is a process of forming water soluble manganese salts of organic acids of low toxicity, including the following acids: citric, tartaric, mucic, gluconic, galactonic, succinic, glycolic, a-aminobutyric, a-aminocaproic, aspartic, glutamic, and acetyl-glutamic and the compounds formed thereby.

One illustrative procedure that has been found satisfactory is as follows: One hundred twelve grams of crystalline tetrahydrate of manganous sulphate are dissolved in 1500 cc. of water at room temperature. With rapid stirring 165 cc. of exactly six times normal sodium hydroxide were added. The strength of the hydroxide should be determined by titration, and the amount added should be slightly less than the chemical equivalent of sulphate present. The stirring should be vigorous and result in a finely divided precipitate of maganous hydroxide.

This precipitate is washed with distilled water five time by decantation, keeping the vessel covered while the precipitate is allowed to settle. It is then filtered through a suction filter, as rapidly as possible, and washed free from sulphates.

The precipitate is now stirred rapidly into a suspension of 157 grams of glutamic acid in 500 cc. of water at 90–100° C. During the addition and while the stirring is taking place, the temperature is raised rapidly to boiling. As soon as the addition is completed, the mass is filtered hot and the clear filtrate is concentrated under a reduced pressure of about 50 mm. to a syrupy consistency with a volume of about 200 cc.

While stirring this syrup with a clean spatula, 500 cc. of 95% ethyl alcohol are added, and the precipitated gummy mass is worked thoroughly until the consistency of the mass becomes crispy. This working ordinarily takes about ten minutes. The alcohol is then decanted and a new 300 cc. portion of alcohol is stirred in and then decanted, and two more 300 cc. portions are added successively and decanted, making a total of four successive treatments with 95% ethyl alcohol.

Finally the mass is washed with 400 cc. of absolute ethyl alcohol and the washings decanted. The mass is now dried in an oven as follows: 60° C. for four hours; 80° C. for eight hours; 115° C. for twelve hours.

The resulting material is pulverized and again dried at 125° C. to constant weight, which ordinarily takes about ten hours.

In one actual experiment the yield was 148 grams, or 92% of the full theoretical amount.

Analysis of the product corresponds to a compound of the formula $(C_5H_8O_4N)_2Mn$. Quantitative analysis of the product gave 15.70% manganese and 8.11% nitrogen against theoretical amounts of 15.82% manganese and 8.07% nitrogen.

An alternative procedure that is operative but has not so far yielded quite as satisfactory results is to prepare manganous hydroxide as in the preceding example, and after evaporating the solution of acid manganous glutamate to a syrupy consistency, place the same in an oven at 100° C. for four days. In this manner a glassy material can be obtained which may be pulverized to powder and dried again at 100° C. to constant weight. This compound analyzes to be the dihydrate of the acid salt, with the formula $(C_5H_8O_4N)_2Mn.2H_2O$, and quantitative analysis has given manganese 14.30% and nitrogen 7.41% against theoretical percentages of 14.33% for manganese and 7.31% for nitrogen. This compound is also suitable for treatments but the anhydrous compound first described is preferred because it is not as hygroscopic and can be pulverized and handled with greater ease.

Each of the compounds obtained as above described is very soluble in water and insoluble in ethyl alcohol or ether. Aqueous solutions give a very slightly acid reaction, and the pH of a 1% solution is 6.1. Heating to boiling for one hour does not seem to deposit any film of the metallic oxide, whereas most manganese salts of organic acids do deposit a film under such conditions. The addition of excess alkali gives a precipitate of manganous hydroxide.

For the purpose of injecting the aqueous solution of the compound intramuscularly to human beings, we find a 1% solution of the salt with 0.25% of phenol or meta-cresol to be the best method of administration. For most acute cases two injections of one cc. each in adults at intervals up to four days are sufficient. No more than three injections should be given.

I am aware of the availability of manganese butyrate for similar intramuscular injection. I have determined a minimum fatal dose in rabbits for manganese butyrate to be 37 mg. of manganese per kilogram of animal. The minimum fatal dose for the acid glutamate prepared as described above is 62 mg. of manganese per kilogram of animal. From these results I conclude that the acid glutamate is about one-half as toxic as the manganese butyrate. The administration of the butyrate is also known to be painful.

As glutamic acid is a dicarboxylic acid, it can form two salts: the normal salt $C_5H_7O_4N.Mn$, and the acid salt $(C_5H_8O_4N_2)_2Mn$. The normal salt is easily prepared by the addition of freshly prepared manganous hydroxide to a solution of glutamic acid, and precipitates out in a short time as a light brown crystalline powder, but the normal compound is insoluble in water, glycerol, glycol, ethyl alcohol, or the usual organic solvents. It is not suitable for therapeutic purposes due to its insolubility. This has been confirmed by the fact that injections of a suspension in animals produced infiltrates at the point of injection and had no apparent curative effect.

The acid salt of glutamic acid could not be prepared by the usual methods, but procedure according to the methods outlined hereinabove is successful in producing it.

The dehydrated salt resulting from drying at 125° C. dissolves in water with ease, and the solution is identical with that obtained from the di-hydrate.

I have also prepared similar water-soluble salts of the other organic acids hereinabove mentioned other than butyric acid, and find them suitable for therapeutic uses.

Without further elaboration, the foregoing will so fully explain my invention that others may, by applying knowledge current at the time of such application, readily adapt the same for use under various conditions of service.

I claim:

1. A process for making manganese glutamate suitable for pharmaceutical and therapeutic use and free from impurities detrimental to such use, which consists of treating a saturated solution of glutamic acid with finely divided manganous hydroxide at 90°–100° C. and rapidly filtering, concentrating by evaporation under reduced pressure and precipitating by alcohol substantially as described.

2. A soluble manganese glutamate having 14.3% of manganese and 7.4% of nitrogen.

3. A soluble manganese glutamate with 15.70% of manganese and 8.11% of nitrogen.

4. An acid manganese glutamate having one atom of manganese to two molecules of glutamic acid.

5. A water-soluble salt of manganese and glutamic acid.

6. A water soluble salt of manganese and an acid selected from a group consisting of glycolic, a-aminobutyric, a-aminocaproic, aspartic, glutamic, and acetyl-glutamic acids.

7. A process for making a water-soluble salt of manganese and glutamic acid, which includes the step of reacting manganous hydroxide with glutamic acid in the proportions of the acid salt and at a temperature above that at which the insoluble normal salt tends to form.

8. A process for making a water-soluble salt of manganese and glutamic acid, which includes the step of reacting manganous hydroxide with glutamic acid in aqueous solution.

NICHOLAS D. CHERONIS.